(12) United States Patent
Srinivasan et al.

(10) Patent No.: US 9,425,893 B1
(45) Date of Patent: Aug. 23, 2016

(54) METHODS AND APPARATUS FOR IMPLEMENTING OPTICAL INTEGRATED ROUTING WITH TRAFFIC PROTECTION

(71) Applicant: Juniper Networks, Inc., Sunnyvale, CA (US)

(72) Inventors: Eswaran Srinivasan, Fremont, CA (US); John D. Johnson, Los Altos, CA (US); Geoffrey A. Mattson, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 315 days.

(21) Appl. No.: 13/956,094

(22) Filed: Jul. 31, 2013

(51) Int. Cl.
- *H04B 10/03* (2013.01)
- *H04L 1/00* (2006.01)
- *H04B 10/032* (2013.01)

(52) U.S. Cl.
CPC .............. *H04B 10/032* (2013.01); *H04L 1/00* (2013.01)

(58) Field of Classification Search
CPC ....................................................... H04B 10/03
See application file for complete search history.

(56) References Cited

U.S. PATENT DOCUMENTS

| | | | | |
|---|---|---|---|---|
| 6,618,395 B1* | 9/2003 | Kimmitt | ........................ | 370/473 |
| 6,662,332 B1* | 12/2003 | Kimmitt | ........................ | 714/762 |
| 6,738,935 B1* | 5/2004 | Kimmitt | ........................ | 714/701 |
| 8,873,579 B1* | 10/2014 | Lo et al. | ........................ | 370/465 |
| 2008/0138075 A1* | 6/2008 | Gustlin et al. | ................ | 398/115 |
| 2010/0080248 A1* | 4/2010 | Aweya et al. | ................. | 370/503 |
| 2010/0162033 A1* | 6/2010 | Ahn et al. | ........................ | 714/4 |
| 2012/0155486 A1* | 6/2012 | Ahn et al. | ..................... | 370/433 |
| 2012/0237199 A1* | 9/2012 | Akiyama | .................. | H04J 3/14 398/2 |
| 2014/0321845 A1* | 10/2014 | Jiang | .................. | H04Q 11/0067 398/5 |
| 2014/0380132 A1* | 12/2014 | Ran | .............................. | 714/776 |

OTHER PUBLICATIONS

Nicholl; 100GE and 40GE PCS Overview; IEEE P802.3az Energy Efficient Ethernet Task Force, Plenary Meeting presentation; pp. 1-27, Nov. 2008 [online], [retrieved on Jul. 16, 2015]. Retrieved from the Internet <URL: http://www.ieee802.org/3/az/public/nov08/nicholl_02_1108.pdf>.*

(Continued)

*Primary Examiner* — Nathan Curs
(74) *Attorney, Agent, or Firm* — Cooley LLP (57) ABSTRACT

In some embodiments, an apparatus includes a switch device that can be operatively coupled to a network having a set of links. The switch device can receive at a first time, a message having a set of physical coding sublayer (PCS) lanes. The message can include an error notification within a first subset of PCS lanes from the set of PCS lanes and not within a second subset of PCS lanes from the set of PCS lanes. The error notification is associated with signal degradation of a link from the set of links, where the switch device can send a first signal in response to receiving the message at the first time. The switch device can also receive at a second time a message without the error notification, and the switch device can send a second signal in response to receiving the message at the second time.

20 Claims, 5 Drawing Sheets

(56) References Cited

OTHER PUBLICATIONS

Inst. of Electrical and Electronics Engineers, IEEE 802.3-2012, Section Four, pp. 1-36 and 332-338; Jan. 13, 2013 [online], [retrieved on Jul. 16, 2015]. Retrieved from the Internet <URL: http://ieeexplore.ieee.org/stamp/stamp.jsp?arnumber=6419738>.*

IEEE Computer Society, IEEE Standard for Information technology—Telecommunications and information exchange between systems—Local and metropolitan area networks—Specific requirements—Part 3: Carrier SenseMultiple Access with Collision Detection (CSMA/CD) Access Method and Physical Layer Specifications—Amendment 4: Media Access Control Parameters, Physical Layers, and Management Parameters for 40 Gb/s and 100 Gb/s Operation, IEEE Std. 802.3ba™—2010 (Amendment to IEEE Std. 802.3™—2008), 457 pages.

* cited by examiner

```
┌─────────────────────────────────────────────────┐
│ Set the first threshold value, the second       │
│ threshold value and the third threshold value   │
│ 402                                             │
└─────────────────────────────────────────────────┘
                        ↓
┌─────────────────────────────────────────────────┐
│ Receive at a first time a message having a set  │
│ of physical coding sublayer (PCS) lanes and     │
│ including an error notification associated with │
│ signal degradation of a link from a set of links│
│ 404                                             │
└─────────────────────────────────────────────────┘
                        ↓
┌─────────────────────────────────────────────────┐
│ Send a first signal in response to receiving    │
│ the message at the first time                   │
│ 406                                             │
└─────────────────────────────────────────────────┘
                        ↓
┌─────────────────────────────────────────────────┐
│ Receive at a second time a message without an   │
│ error notification associated with signal       │
│ degradation of a link from the set of links     │
│ 408                                             │
└─────────────────────────────────────────────────┘
                        ↓
┌─────────────────────────────────────────────────┐
│ Send a second signal in response to receiving   │
│ the message at the second time                  │
│ 410                                             │
└─────────────────────────────────────────────────┘
                        ↓
┌─────────────────────────────────────────────────┐
│ Receive at a third time a message including an  │
│ error notification associated with signal       │
│ failure of a link from the set of links         │
│ 412                                             │
└─────────────────────────────────────────────────┘
                        ↓
┌─────────────────────────────────────────────────┐
│ Send a third signal in response to receiving    │
│ the message at the third time                   │
│ 414                                             │
└─────────────────────────────────────────────────┘
                        ↓
┌─────────────────────────────────────────────────┐
│ Receive at a fourth time a message without an   │
│ error notification associated with signal       │
│ failure of a link from the set of links         │
│ 416                                             │
└─────────────────────────────────────────────────┘
                        ↓
┌─────────────────────────────────────────────────┐
│ Send a fourth signal in response to receiving   │
│ the message at the fourth time                  │
│ 418                                             │
└─────────────────────────────────────────────────┘
```

METHODS AND APPARATUS FOR IMPLEMENTING OPTICAL INTEGRATED ROUTING WITH TRAFFIC PROTECTION

BACKGROUND

Some embodiments described herein relate generally to methods and apparatus for the transmission of high-speed data in computer networks. In particular, but not by way of limitation, some embodiments described herein relate to methods and apparatus for the transmission of high-speed data in computer networks by transmitting data in a single stream as a set of physical coding sublayer (PCS) lanes that can include an error notification within a first subset of PCS lanes from the set of PCS lanes and not within a second subset of PCS lanes from the set of PCS lanes mutually exclusive from the first subset of PCS lanes.

Advances in data center technology and Internet usage have pushed enterprise data centers from Gigabit Ethernet links to 10 Gigabit Ethernet (GbE) links and search engines/carriers/internet service providers (ISPs) from single 10 GbE links to multiple links. Projected growth predicts higher-speed Internet connections such as, for example. 40 GbE connections and/or 100 GbE connections.

Implementation of high-speed Internet connections such as, for example, 40 GbE connections and/or 100 GbE connections over existing infrastructure will likely take advantage of existing copper and fiber cables, both in the data center and over the Internet. No current technology however, exists that can transport data at rates of 40 Gbps and/or 100 Gbps as a single stream (e.g., through data centers and/or the Internet).

Accordingly, a need exists for methods and apparatus for transmission of high-speed data as a single stream through data centers and the Internet using existing physical resources.

SUMMARY

In some embodiments, an apparatus includes a switch device that can be operatively coupled to a network having a set of links. The switch device can receive at a first time, a message having a set of physical coding sublayer (PCS) lanes. The message can include an error notification within a first subset of PCS lanes from the set of PCS lanes and not within a second subset of PCS lanes from the set of PCS lanes. The error notification is associated with signal degradation of a link from the set of links, where the switch device can send a first signal in response to receiving the message at the first time. The switch device can also receive at a second time a message without the error notification, and the switch device can send a second signal in response to receiving the message at the second time.

DETAILED DESCRIPTION

In some embodiments, an apparatus includes a switch device that can be operatively coupled to a network having a set of links. The switch device can receive at a first time, a message having a set of physical coding sublayer (PCS) lanes. The message can include an error notification within a first subset of PCS lanes from the set of PCS lanes and not within a second subset of PCS lanes from the set of PCS lanes mutually exclusive from the first subset of PCS lanes. The error notification is associated with signal degradation of a link from the set of links, where the switch device can send a first signal in response to receiving the message at the first time. The switch device can also receive at a second time a message without the error notification, and the switch device can send a second signal in response to receiving the message at the second time.

In some embodiments, an apparatus includes an optical switch device that can be operatively coupled to a switch device and a network having a set of links. The optical switch device can receive an indication of signal degradation associated with a link from the set of links. The optical switch device can send at a first time a message having a set of physical coding sublayer (PCS) lanes in response to the indication of signal degradation. In such embodiments, the message can include an error notification within a first subset of PCS lanes from the set of PCS lanes and not within a second subset of PCS lanes from the set of PCS lanes mutually exclusive from the first subset of PCS lanes, where the error notification is associated with the signal degradation condition. In such embodiments, the optical switch device can also receive an indication of no signal degradation associated with the link, and can send at a second time a message without the error notification in response to the indication of no signal degradation.

In some embodiments, an apparatus includes a switch device that can be operatively coupled to a network having a set of links. The switch device can receive at a first time a message having an error notification associated with signal degradation of a first link from the set of links, and the switch device can send a first signal in response to receiving the message at the first time. In such embodiments, the switch device can also receive at a second time a message having an error notification associated with signal failure of a second link from the set of links, and the switch device can send a second signal in response to receiving the message at the second time.

As used in this specification, the terms "communication link" and "link" are used interchangeably, unless the context clearly dictates otherwise, and can refer to, for example, any link that can transmit control units (e.g., control packets, control cells, etc.) and/or data units (e.g., data packets, data cells, etc.) between a first optical switch device and a second optical switch device that is associated with establishing, maintaining, and terminating a communication session between a first switch device and a second switch device.

As used in this specification, the singular forms "a," "an" and "the" include plural referents unless the context clearly dictates otherwise. Thus, for example, the term "a switch device" is intended to mean a single switch device or a combination of switch devices.

Figure 1:
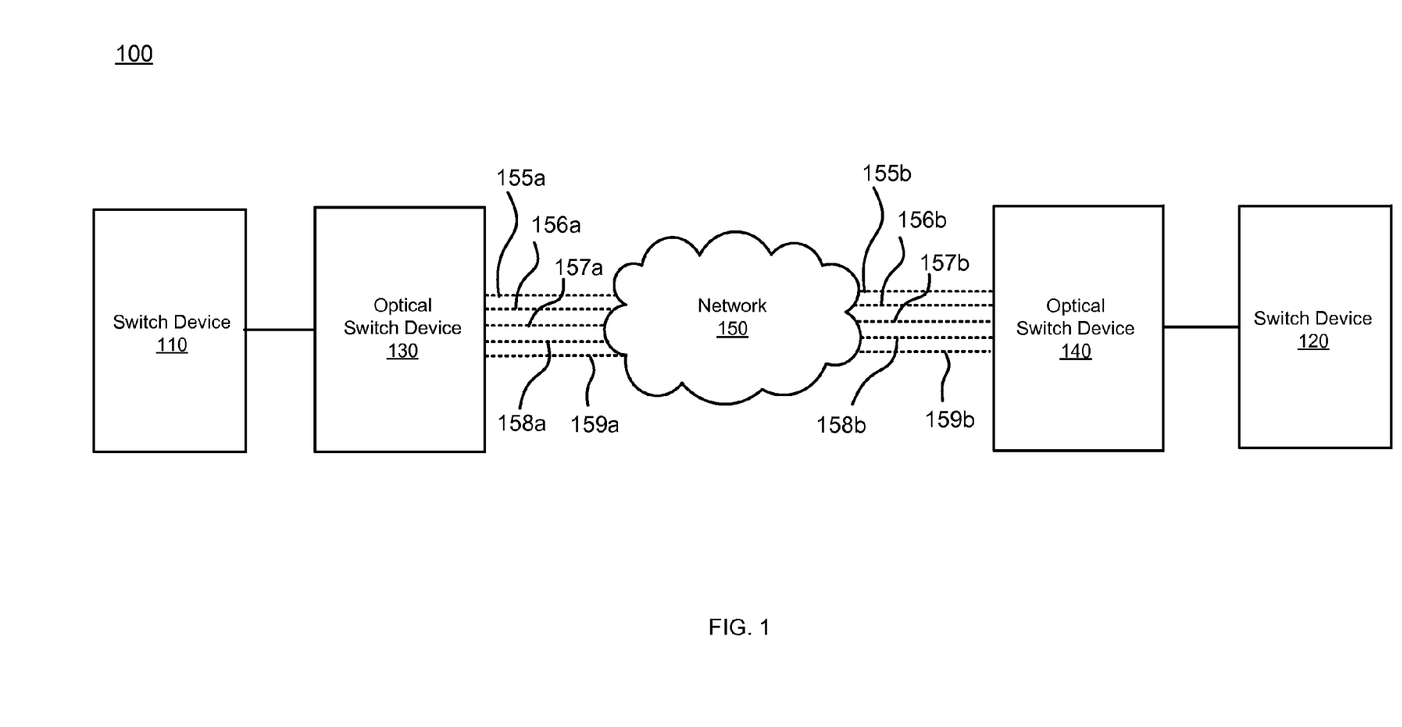
FIG. 1 is a schematic illustration of a system for implementing optical integrated routing with traffic protection, according to an embodiment.

FIG. 1 is a schematic illustration of a system for implementing optical integrated routing with traffic protection, according to an embodiment. The routing system 100 includes a first switch device 110, a second switch device 120, a first optical switch device 130, a second optical switch device 140 and a network 150. The network 150 is coupled to the first optical switch device 130 via a set of communication links 155a-159a, and the network 150 is coupled to the second optical switch device 140 via a set of communication links 155b-159b. The network 150 can be any type of network (e.g., a local area network (LAN), a wide area network (WAN), a virtual network, a telecommunications network) implemented as a wired network and/or wireless network. As described in further detail herein, in some embodiments, for example, the optical switch device 130 can be operably coupled to the optical switch device 140 via network 150 that can be an intranet, an Internet Service Provider (ISP) and the Internet, a cellular network, and/or the like.

The communication links (or "links") 155a-159a and 155b-159b can be implemented through, for example, copper twisted-pair electrical cables, single-mode or multi-mode fiber optic cables, and/or the like. The communication links 155a-159a and 155b-159b can transmit control units (e.g., control packets, control cells, etc.) and/or data units (e.g., data packets, data cells, etc.) between the first optical switch device 130 and the second optical switch device 140 that can be associated with establishing, maintaining, and/or terminating a communication session between the first switch device 110 and the second switch device 120. Communication sessions between the first switch device 110 and the second switch device 120 can include, for example, hypertext transfer protocol (HTTP) sessions, telnet remote login sessions, session initiation protocol (SIP) based Internet phone calls, transmission control protocol (TCP) sessions, and/or the like.

Examples of control units and/or data units passing through the communication links 155a-159a and 155b-159b can include emails; communication signals associated with web pages; signals associated with running mobile communication applications; signals associated with the quality of service (QoS) of the communication session between the first optical switch device 130 and the second optical switch device 140; signals associated with peripheral processing devices (e.g., compute nodes, service nodes, routers, storage nodes, servers, storage devices, gateways, workstations, etc.) connected to the switch devices 110 and 120 at any given time; signals associated with communication sessions between the first optical switch device 130 and the second optical switch device 140 that fails due to, for example, software failure, hardware failure, unknown causes, etc.; signals associated with the data upload and download transmission speeds from the switch device 110 or 120 to the optical switch device 130 or 140, and/or the like.

The switch devices 110 and 120 can be any device that includes one (or a set of) 40 Gbit and/or a 100 Gbit interface(s) and can operatively couple peripheral processing devices to the network 150. In some instances, the switch device 110 and 120 can be edge devices, input/output modules, top-of-rack (TOR) devices, and/or the like. Structurally, the switch devices 110 and 120 can function as source access switches and/or routers and also destination access switches and/or routers. Accordingly, a switch device 110 or 120 can send data units (e.g., a data stream of data packets and/or data cells) to and receive data units from, for example, the optical switch devices 130 and/or 140, the network 150, and from any peripheral processing devices connected to the switch device 110 or 120. Each switch device 110 or 120 can communicate with the other switch device 110 or 120 through a set of communication links (e.g., links 155a-159a and links 155b-

159b) via the optical switch devices 130 and 140 and the network 150. For example, the network 150 can transmit data units between the switch device 110 and the switch device 120. Additionally, the switch device 110 and 120 can include multiple optical and/or electronic of ports (e.g., egress ports and/or ingress ports) (not shown in FIG. 1) through which the switch device 110 or 120 can transmit and/or receive data units.

In other instances, the switch device 110 and/or the switch device 120 can be an Ethernet service router that can provide high-performance switching features that are implemented by high-performance service providers and enterprises. In such instances, the switch devices 110 and 120 can provide, for example, advanced multiprotocol label switching (MPLS), multicast services, Quality of Service functionalities, low latency and security capabilities. In such instances, the switch devices 110 and 120 can also provide flexibility and reliability to support advanced applications and services, including high-speed transport and virtual private network (VPN) services, next-generation broadband multiplay services, high-volume internet data center internetworking, and/or the like.

In some instances, the switch device 110 and/or the switch device 120 can receive at a first time, a message (or a data stream) from the optical switch device 130 or the optical switch device 140, which has a set of physical coding sublayer (PCS) lanes. The message can include an error notification within a first subset of PCS lanes from the set of PCS lanes (and not within a second subset of PCS lanes from the set of PCS lanes and mutually exclusive from the first subset of PCS lanes). For example, the first subset of PCS lanes can be the odd PCS lanes from the set of PCS lanes and the second subset of PCS lanes can be the even PCS lanes from the set of PCS lanes. The error notification can be associated with signal degradation of a first link from the set of links (e.g., 155a-159a and 155b-159b), and the switch device 110 and/or 120 can send a first signal in response to receiving the message at the first time. The switch device 110 and/or 120 can also receive at a second time a message (or a data stream) from the optical switch device 130 or the optical switch device 140 without an error notification associated with a signal degradation of a link from the set of links, and the switch device 110 and/or 120 can send a second signal in response to receiving the message at the second time.

In some instances, the switch device 110 and/or the switch device 120 can receive at a third time, a message (or a data stream) from the optical switch device 130 or the optical switch device 140. The message can include an error notification within the first subset of PCS lanes from the set of PCS lanes that is associated a signal failure of a second link from the set of links (e.g., the links 155a-159a and the links 155b-159b), and the switch device 110 and/or 120 can send a third signal in response to receiving the message at the third time. The switch device 110 and/or 120 can also receive at a fourth time a message (or a data stream) from the optical switch device 130 or the optical switch device 140 without an error notification associated with a signal failure of a link from the set of links, and the switch device 110 and/or 120 can send a fourth signal in response to receiving the message at the fourth time.

The optical switch device 130 and 140 can be any device (e.g., a routing device, a switching device, etc.) that includes one or more 40 Gbps and/or 100 Gbps optical and/or electrical interface and can operatively couple the switch devices (e.g., switch device 110 and/or 120 in FIG. 1) to the network 150 via a set of optical communication links (e.g., the links 155a-159a and/or the links 155b-159b in FIG. 1). Note that each communication link (or link) is associated with a separate 40 Gbps or 100 Gbps interface. The optical switch devices 130 and 140 can function as intermediate access switches and/or routers for transmitting and/or receiving high-speed data units between peripheral processing devices that are coupled to separate switch devices 110 and/or 120. Accordingly, the optical switch devices 130 and 140 can send data units (e.g., a data stream of data packets and/or data cells) to and/or receive data units from, for example, the switch devices 110 and/or 120, the network 150, and from any peripheral processing devices coupled to the switch devices 110 and/or 120. Each optical switch device 130 or 140 can communicate with the other optical switch device 130 or 140 through a set of (optical) communication links (e.g., 155a-159a and 155b-159b) via the network 150. For example, the network 150 can transmit high-speed data units (e.g., at 40 Gbps and/or 100 Gbps speeds) as a single data stream (a data stream is a group of data units) between the optical switch device 130 and the optical switch device 140 via a set of (optical) communication links (e.g., the links 155a-159a and the links 155b-159b). Additionally, the optical switch device 130 and/or 140 can include multiple optical and/or electronic ports (e.g., egress ports and/or ingress ports) through which the optical switch device 130 and 140 can transmit and/or receive data units from the network 150 (e.g., via optical ports) and transmit and/or receive data units and/or control units from the switch device 110 and/or 120 (e.g., via the electrical ports).

In some instances, the optical switch device 130 and/or 140 can receive an indication of signal degradation (from the network 150) associated with a first link from the set of links (e.g., the links 155a-159a or the links 155b-159b). In such instances, the optical switch device 130 and/or 140 can send at a first time a first message (or signal) having a set of PCS lanes in response to the indication of signal degradation. The first message (or signal) can include an error notification within a first subset of PCS lanes from the set of PCS lanes and not within a second subset of PCS lanes from the set of PCS lanes and mutually exclusive from the first subset of PCS lanes. In such instances, the error notification can be associated with (indicate or represent) the signal degradation associated with the first link from the set of links (e.g., the links 155a-159a or the links 155b-159b). The optical switch device 130 and/or 140 can also receive an indication (or signal) from the network 150 of no signal degradation associated with a link from the set of links (e.g., the links 155a-159a and the links 155b-159b). In such instances, the optical switch device 130 and/or 140 can send at a second time, a second message (or signal) without the error notification in response to receiving the indication of no signal degradation associated with a link from the set of links.

In other instances, the optical switch device 130 and/or the optical switch device 140 can receive, an indication of a signal failure (from the network 150) that is associated with a second link from the set of links (e.g., the links 155a-159a or the links 155b-159b). In such instances, the optical switch device 130 and/or the optical switch device 140 can send at a third time, a third message (to the switch device 110 or 120) that includes an error notification associated with the signal failure of the second link in response to receiving the indication of the signal failure (that was received from the network 150). In yet other instances, the optical switch device 130 and/or the optical switch device 140 can receive an indication of no signal failure (from the network 150) associated with a link from the set of links (e.g., the links 155a-159a and the links 155b-159b). In such instances, the optical switch device 130 and/or the optical switch device 140 can send at a fourth time, a fourth message (to the switch device 110 and/or the switch device 120) that does not include an error notification in response to receiving the indication of no signal failure associated with a link from the set of links.

The indication of signal degradation of a link from the set of links can be associated with a first threshold value and the indication of no signal degradation of a link from the set of links can be associated with a second threshold value lower than the first threshold value. Additionally, the indication of signal failure of a link from the set of links can be associated with a third threshold value greater than the first threshold value and the second threshold value. The first threshold value, the second threshold value and the third threshold value can be set by, for example, a network administrator at the switch device 110 or 120 and can be sent through a signal from the switch device 110 or 120 to the optical switch device 130 or 140. Following this example, the message at the first time is sent in response to a pre-forward-error-correction (FEC) error rate associated with the first link exceeding the first threshold value, and the message at the second time is sent in response to a pre-FEC error rate associated with the first (or any) link being below the second threshold value that is lower than the first threshold value. Additionally, the message at the third time is sent in response to a pre-forward-error-correction (FEC) error rate associated with the second link exceeding the third threshold value. In other instances, a network administrator can set the first threshold value, the second threshold value and the third threshold value at the optical switch device 130 and/or 140 (instead of the switch device 110 and/or 120).

The optical switch devices 130 and 140 can monitor the status of all the links from the set of links (e.g., the links 155a-159a and the links 155b-159b) at periodic or substantially periodic time intervals to detect any signal degradation (SD) and/or signal failure (SF) conditions based on the first threshold value, the second threshold value and the third threshold value. In some instances, when signal degradation associated with a link from the set of links (e.g., the links 155a-159a and the links 155b-159b) occurs, the optical switch device 130 and/or 140 can detect the degradation in signal quality in the link from the set of links, and/or receive a signal from a network node or device in the network 150 that indicates the degradation in signal quality in the link from the group of links. The degradation in signal quality can be associated with a pre-forward-error-correction (FEC) error rate associated with the link exceeding a first threshold value as configured at, for example, the switch device 110 or 120.

Upon detection of the SD condition, the optical switch device 130 and/or 140 can configure the bit-interleaved parity-8 (BIP-8) error check in the desired PCS lanes of a particular link in data units to be sent from optical switch devices 130 and/or 140. The BIP-8 error check can indicate the status of the payload in a data unit (i.e., a message) and is calculated over all the bits of an alignment marker of a desired PCS lane. The BIP-8 error check is inserted into the BIP-3 and BIP-7 byte location of the alignment marker in the desired PCS lane. BIP-8 error checks are set such that the overall data stream in the desired PCS lane has either even or odd parity. In such instances, the optical switch device 130 and/or 140 can swap the BIP-3 and BIP-7 bytes of the PCS lane alignment markers with the BIP-8 error check and send the data units with the (BIP-8) error check to the switch device 110 and/or 120. The BIP-8 error check is typically sent on the even PCS lanes, for example, PCS lanes 0,2,4,6,8,10, 12,14,16 and 18 for a 20 PCS lane message (or signal). In such instances, the switch device 110 and/or 120 can receive the message with BIP-8 error check in the alignment marker of the desired PCS lanes.

Based on the information on the error rate of the link included in the BIP-8 error check, the switch device 110 or 120 can calculate the desired link status degradation level between 0%-100%, where 0% can indicate that the link associated with the interface is active. In some instances, a link status degradation level of 100% can indicate that the link associated with the interface is unoperational due to signal failure. In other instances, a link status degradation level of lower than 100% (e.g., 70%) can be indicative of a non-operational link associated with an interface due to signal failure. Other values between 0% and the percentage value set as a cut-off point for signal failure can indicate that the interface's link status is partially degraded. The desired link is not forced into an inactive state by the switch device 110 or 120 if the signal from the desired link is degraded (i.e., not signal failure). Control signals that can represent various corrective methods such as, for example, signal amplification, or noise cancellation via time-averaging the signal, can be sent from the switch device 110 or 120 to improve the signal quality in the desired link. Note that signal degradation (SD) condition is determined in the BIP-3 and BIP-8 bytes of the alignment marker of the desired PCS lanes.

In some instances, when the optical switch device 130 or 140 can detect no signal degradation or the elimination of an SD condition in a link from the set of links (e.g., the links 155a-159a and the links 155b-159b), the optical switch device 130 or 140 can stop sending messages with the BIP-8 error check to the switch device 110 or 120. In such instances, the switch device 110 or 120 can detect the indication of the end of the SD state with a link from the set of links and can stop sending control signals representing corrective methods.

In other instances, the optical switch device 130 or 140 can either directly detect an SF condition associated with a link from the set of links or receive a signal from a network node or a device in the network 150 that indicates the SF condition associated with a link from the set of links. The SF condition can be associated with a pre-forward-error-correction (FEC) error rate associated with the link exceeding the third threshold value as configured by, for example, the switch device 110 or 120. Upon detection of the SF condition, the optical switch 130 or 140 can send a PCS Local Fault (LF) signal to the switch device 110 or 120 that is downstream from the optical switch device (i.e., towards the destination device end for the data stream but not necessarily towards the source device end). The switch device 110 or 120 can detect the SF condition by receiving the PCS-LF message from the optical switch device 130 or 140 and can de-activate the desired link by, for example, stopping the transfer of data units through the failed link. Additionally, the switch device 110 or 120 can generate and send PCS remote fault (RF) messages to the optical switch device 130 or 140. The switch device 110 or 120 can also send control signals to the optical switch device 130 or 140 to re-direct the transmitted data (including all the PCS lanes) from the failed link to a backup link form the set of links that is associated with a functional interface. In such instances, the backup link typically has a higher bandwidth (e.g., >100 Gbps) than the failed link so that the backup link can transmit the new re-routed data stream (from the failed link) in addition to any data stream the backup link was transmitting prior to the re-routing event.

In yet other instances, when the optical switch device 130 or 140 can detect no SF condition or the elimination of a previously existing SF condition associated with a link from the set of links (e.g., the links 155a-159a and the links 155b-159b), the optical switch device 130 or 140 can stop sending PCS-LF messages to the switch device 110 or 120. In such instances, the switch device 110 or 120 can also detect the end of the SF condition or the elimination of a previously existing SF condition in a link from the set of links and can stop sending PCS-RF messages to the optical switch device 130 or 140. In such instances, the switch device 110 or 120 can send control signals to the optical switch device 130 or 140 representing instructions to re-direct the data stream from the (temporary) backup link back to the master link that is no longer in the SF condition.

Figure 2:
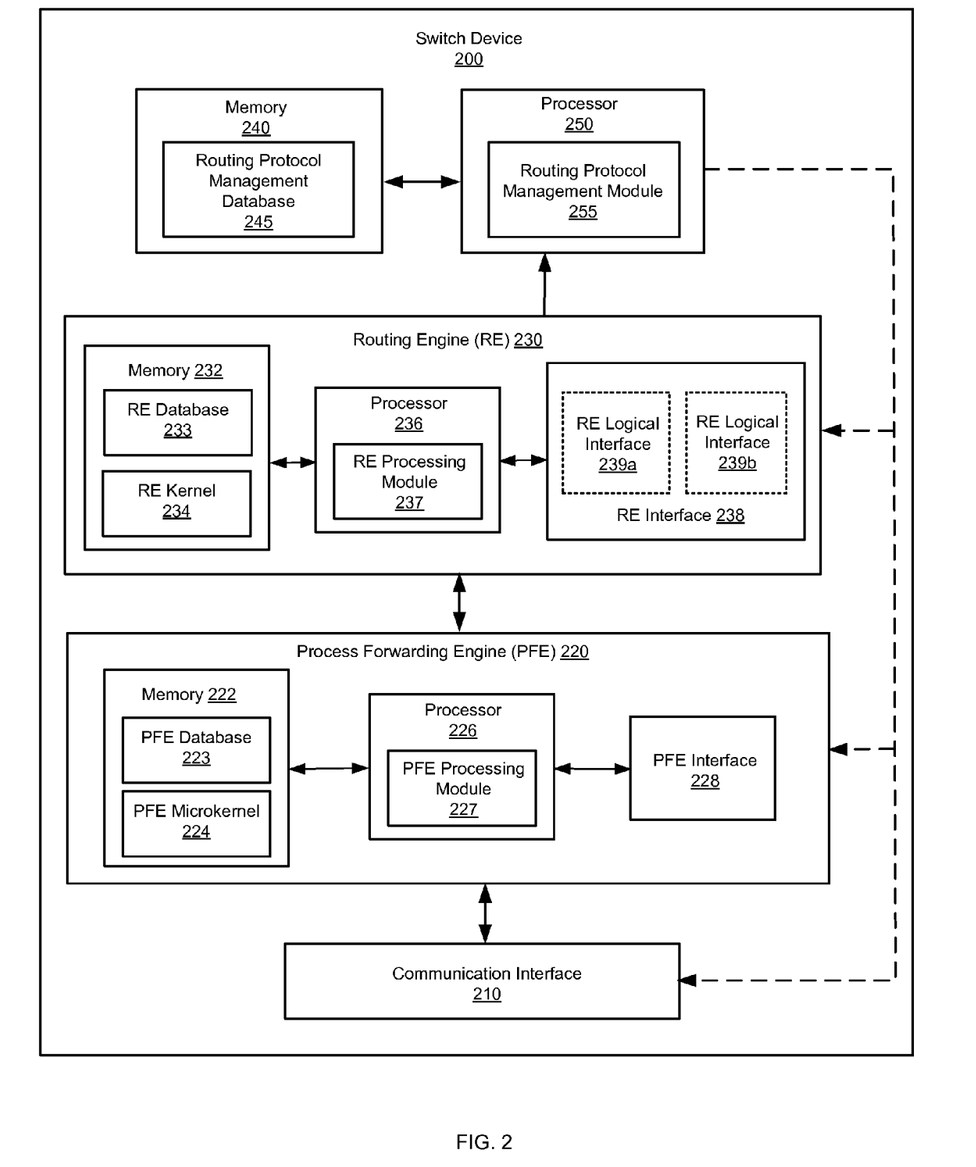
FIG. 2 is a system block diagram of a switch device, according to an embodiment.

FIG. 2 is a system block diagram of a switch device, according to an embodiment. Similar to switch device 110 and/or switch device 120 in the routing system 100 shown in FIG. 1, switch device 200 can be any device that includes one (or a set of) 40 Gbps and/or a 100 Gbps interface(s) and can operatively couple peripheral processing devices (e.g., compute nodes, service nodes, routers, storage nodes, servers, storage devices, gateways, workstations, etc.) to an enterprise network or to the Internet. The switch device 200 can be, for example, an edge device, an input/output module, a top-of-rack (TOR) device, an Ethernet service router that can provide high-performance switching and routing features for high-performance service providers and enterprises, and/or the like. As shown in FIG. 2, the switch device 200 includes a communication interface 210, a process forwarding engine (PFE) 220, a routing engine (RE), a memory 240 and a processor 250. Each component of switch device 200 is operatively coupled to the other components of the switch device 200 as shown in FIG. 2. Furthermore, the operations of the communication interface 210 (e.g., transmit/receive data units and/or control units) as well as manipulations on the memory 240, can be controlled by the processor 250.

The communication interface 210 can include multiple electrical and optical ports for implementing a wired connection (or communication link) between the switch device 200 and optical switch devices (e.g., via optical ports and/or electrical ports) and wired connections between the switch device 200 and a set of wired peripheral processing devices (e.g., via electrical ports). The wired connection can be, for example, twisted-pair electrical signaling via electrical cables, fiber-optic signaling via fiber-optic cables, and/or the like. As such, switch device 200 can receive data units and control units and/or transmit data units and control units through the communications interface 210 that is operably coupled to the communications interface of an optical switch device when switch device 200 is communicating with the optical switch device. Additionally, switch device 200 can receive data units and control units and/or transmit data units and control units through the communications interface 210 that is operably coupled to the communications interface of a peripheral processing device when switch device 200 is communicating with the peripheral processing device. Furthermore, in some instances, switch device 200 can implement a first wired connection (e.g., twisted-pair electrical signaling) with a first device (e.g., peripheral processing device) operatively coupled to the switch device 200, and a second wired connection (e.g., such as fiber-optic signaling) with a second device (e.g., optical switch device) operatively coupled to the switch device 200.

Additionally, the communication interface 210 can also include one or more transceivers, for example, radio-frequency (RF) transceivers, to establish and maintain wireless communication sessions (or communication links) with a set of wireless peripheral processing devices (e.g., a Wi-Fi enabled laptop, a mobile phone, a handheld computing tablet, etc.) using any suitable wireless communication standard such as, for example, Wi-Fi, Bluetooth®, third generation (3G) cellular connection, fourth generation (4G) cellular connection, and/or the like. Furthermore, in some instances, switch device 200 can use a first wireless communication standard to wirelessly communicate with a first wireless peripheral processing device operatively coupled to the switch device 200, and a second wireless communication standard to wirelessly communicate with a second wireless peripheral processing device operatively coupled to the switch device 200. For example, switch device 200 can send data units and/or control units through a first RF transceiver to a first wireless peripheral processing device (e.g., a Wi-Fi enabled laptop not shown in FIG. 2) based on the Wi-Fi standard, and switch device 200 can send data units and/or control units through a second RF transceiver to a second wireless peripheral processing device (e.g., a Bluetooth®— enabled mobile phone not shown in FIG. 2) based on the Bluetooth® standard.

The packet forwarding engine (PFE) 220 is involved in data-unit forwarding through the switch device 200. The PFE 220 processes incoming data units and outgoing data units related to or of the switch device 200. The throughput speed and capacity of the switch device 200 can be defined, for example, by the efficiency of the PFE 220. The PFE 220 can be located, for example, on an individual peripheral component interconnect (PCI) linecard that can be inserted into a PCI slot in the switch device 200 motherboard. The PFE 200 includes a memory 222, a processor 226 and an (PFE) interface 228.

The memory 222 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 222 can store instructions to cause the processor 226 to execute modules, processes and/or functions associated with the PFE 220 and/or the switch device 200. The memory 222 includes a PFE database 223 and a PFE microkernel 224. The PFE microkernel 224 can interact with the different processes (e.g., programs) in the PFE (e.g., interface processes such as interface drivers, chassis processes, etc.) and can monitor and control such processes. The interface processes are associated with the PFE interface 228 and can communicate (e.g., via communication sessions) with the routing engine (RE) kernel 234. Such communication sessions can include, for example, forwarding exception and control units to the RE 230, receiving data units to be forwarded, receiving the forwarding table updates from the RE 230, providing information associated with the status of the PFE 220, and/or the like. The PFE database 223 can store a forwarding table that is typically static (i.e., no dynamic updates of the contents of the forwarding table can occur) until a new forwarding table is received from the RE 230. The forwarding table can include, for example, internet protocol (IP) and/or media access control (MAC) addresses of the next-hop device for any given data unit.

The PFE interface 228 can receive data units from the communication interface 210 and in some instances, can send the data units to the processor 226 for processing. The PFE interface 228 can also send control signals to the communications interface 210 for eventual transmission to one or multiple peripheral processing device(s) or one or multiple optical switch device(s). Additionally, the PFE interface 228 can send and/or receive control units (or signals) and data units from the routing engine (RE) interface 238 (e.g., receive information representing routing paths calculated for each data unit, receive forwarding table updates, send status information on the PFE, etc.). The PFE interface 228 can be configured, for example, from the user-command line interface (CLI) processes (e.g., operating system or other programs) running or being executed in the processor 236 of the RE 230 and/or the processor 226 of the PFE 220. The interface processes can interact with the forwarding table (stored in the memory 222) to determine the next-hop information for a data unit transmitting through the switch device 200. The PFE interface processes can also communicate with the processor 226 on the PFE 220 to execute additional functions.

The processor 226 can be a general purpose processor, a field programmable gate array (FPGA), an application specific integrated circuit (ASIC), a digital signal processor (DSP), and/or the like. The processor 226 can run and/or execute applications and/or other modules, processes and/or functions associated with the PFE 220 and/or the switch device 200. The processor 226 can include the PFE processing module 227 that can be a hardware module or a software module stored in the memory 222 and executed in the processor 226. The PFE processing module 227 can perform a variety of tasks such as, for example, encapsulation of data units passing through the switch device 200, decapsulation of encapsulated data units passing through the switch device 200, managing link layer framing and defining data streams (e.g., a group of data units), monitoring the status of the set of the communication links and detecting an SD and/or SF condition associated with individual links from the set of links, monitoring errors such as bit rate error of the data units transmitted through the switch device 200, performing cyclic redundancy checks (CRCs) on the data units passing through the switch device 200, extracting next-hop information from the forwarding table in the PFE database 223, collecting exception packets (or exception units) and sending the exception packets to the RE 230 (exception packets include data units that necessitates special handling by the switch device 200 such as, for example, data units without a destination IP address, data units with the IP options field set, etc.), and/or the like.

The routing engine (RE) 230 performs the central processing and route processing functions of the switch device 200. The routing engine (RE) 230 can be located, for example, on an individual PCI linecard that can be inserted into a PCI slot in the switch device 200. The RE 230 includes a memory 232, a processor 236, and an RE interface 238. The RE interface 238 can receive data units from the PFE interface 228 and in some instances, can send the data units to the processor 250 (of the switch device 200). The RE interface 238 can send control units and data units to the PFE interface 228 and/or receive control units and data units from the PFE interface 228 (e.g., send routing paths calculated for each data unit, send forwarding table updates, receive status information on the PFE, etc.). The RE interface 288 can be configured, for example, from the user-command line interface (CLI) processes (e.g., operating system or other programs) running or being executed in the processor 236 of the RE 230. In some instances, the physical RE interface 238 can be partitioned to multiple logical interfaces 239a and 239b by the RE operating system, where each RE logical interface 239a and/or 239b can be associated with a separate virtual local area network (VLAN) in the enterprise network. Hence, multiple VLANs in the enterprise network can be managed by a single RE interface 238 of a switch device 200, thus reducing the number of switch devices used to manage the VLANs in an enterprise network.

The processor 236 can be a general purpose processor, a field programmable gate array (FPGA), an application specific integrated circuit (ASIC), a digital signal processor (DSP), and/or the like. The processor 236 can run and/or execute applications and/or other modules, processes and/or functions associated with the RE 230 and/or the switch device 200. The processor 236 can include the RE processing module 237 that can be a hardware module or a software module stored in the memory 232 and executed in the processor 236. The RE processing module 237 (in the processor 236) can perform a variety of functions such as, for example: (a) routing protocol packets processing—all routing protocol packets from the received from the network can be directed to the RE 230, and therefore reduces PFE 220 processing needs; (b) software modularity—software functions can be divided by the RE processing module 237 into separate processes, so a failure of one process has minimum detrimental impact on other software processes; (c) in-depth internet protocol (IP) functionality—each routing protocol can be implemented by the RE processing module 237 with a complete set of IP features that can provide full flexibility for advertising, filtering, and modifying routes; routing policies can be set by the RE processing module 237 according to route parameters, such as, for example, prefix, prefix lengths, and border gateway protocol (BGP) attributes, and/or the like; (d) management of interfaces—system management can be implemented by the RE processing module 237 using, for example, a command-line interface (CLI), a craft interface, simple network management protocol (SNMP), and/or the like; (e) storage and change management—configuration files, system images, and microcode can be held and maintained in one primary and two secondary storage locations in the memory 232 by the RE processing module 237 that can allow local and/or remote upgrades; (f) monitoring efficiency and flexibility—alarms can be generated and data units can be counted by the RE processing module 237 without adversely affecting packet forwarding performance.

The memory 232 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 232 can store instructions to cause the processor 236 to execute modules, processes and/or functions associated with the RE 230 and/or the switch device 200. The memory 232 includes the RE database 233 and the RE kernel 234. The processor 236 can construct one or more routing tables and store the routing tables in the RE database 233. The routing tables in the RE database 233 can include all the routes used in past, current and in near-future networks. The RE database 233 can also store the operating system for the RE 230 and can provide the CLI through which the operating system can be configured by a user of the switch device 200.

The RE kernel 234 provides the underlying infrastructure for the operating system running on the switch device 200. From the routing tables stored in the RE database 232, the RE kernel 234 can derive a forwarding table that includes a list of currently of active routes, which can be copied and sent to the PFE 220 (a master copy of the forwarding table can also be also stored in the RE database 233). The RE kernel 234 also communicates with the PFE 220 and maintains the PFE's copy of the forwarding table synchronized with the master copy stored in the RE database 233. The forwarding table in the PFE 220 can be periodically or semi-periodically updated by the RE kernel 234 without interrupting the forwarding functions of the switch device 200. Hence, the RE kernel 234 provides the link between the RE routing tables and the RE forwarding table stored in the RE database 233. The RE 230 can communicate with the PFE 220 through, for example, a 100 Mbps connection between the RE interface 238 and the PFE interface 228.

The memory 240 of the switch device 200 can be, for example, a random access memory (RAM), a memory buffer, a hard drive, a database, an erasable programmable read-only memory (EPROM), an electrically erasable read-only memory (EEPROM), a read-only memory (ROM), and/or so forth located on the motherboard of the switch device 200. The memory 240 can store instructions to cause the processor 250 to execute modules, processes and/or functions associated with the switch device 200 and/or the routing system (e.g., routing system 100 in FIG. 1). The memory 240 includes the routing protocol management database 245 that can store the different routing protocol daemons (RPDs) and/or other applications running on the switch device 200. The memory 250 can also include a database or a look-up table that can store the IP address and/or media access control (MAC) of the various peripheral processing devices associated with each VLAN that is managed by the switch device 200.

The processor 250 can be a general purpose processor, a field programmable gate array (FPGA), an application specific integrated circuit (ASIC), a digital signal processor (DSP), and/or so forth located on the motherboard of the switch device 200. The processor 250 can run and/or execute applications and/or other modules, processes and/or functions associated with the switch device 200 and/or the routing system (e.g., routing system 100 in FIG. 1). The processor 250 can include the routing protocol management module 255 that can be a hardware module or a software module stored in the memory 240 and/or executed in the processor 250. The routing protocol management module 255 can implement or execute various processes (e.g., different RPDs or applications) for generating control signals in response to receiving different kinds of messages (or signals) from the optical switch device that include information on the status of the various communication links between the optical switch device and the network (e.g., network 150 in FIG. 1).

In some instances, upon receiving a message from the optical switch device that includes an error notification associated with an SD condition of a link from the set of links, the routing protocol management module 255 can send control signals to the optical switch device via the communications interface 210 that can represent instructions for implementing corrective measures to mitigate the SD condition of the link (i.e., improve the signal quality in the desired link). Such control signals can include instructions for the optical switch device to keep the desired link active and to implement, for example, various noise cancellation methods via time-based signal averaging, applying filtration methods to filter out out-of-band noise from the signal, implement methods to amplify the signal in the desired link, and/or the like. In other instances, when the switch device 200 receives a signal from the optical switch device that indication no error (i.e., no SD or SF condition) associated with any of the links from the set of links, the routing protocol management module 255 can stop generating and sending control signals representing the corrective methods discussed above.

In some instances, upon receiving a message from the optical switch device that includes an error notification associated with an SF condition of a link from the set of links (i.e., receiving PCS-LF messages from the optical switch device), the routing protocol management module 255 can send control signals to the optical switch device via the communications interface 210 that can represent instructions to stop the transmission of data units through the failed ink (i.e., failed link is effectively de-activated). Additionally, the routing protocol management module 255 can generate and send PCS remote fault (PCS-RF) messages to the optical switch device. In such instances, the routing protocol management module 255 can also generate and send control signals to the optical switch device to re-direct subsequent data streams (including all the PCS lanes of the subsequent data streams) from the failed (or primary) link to a back-up link from the set of links that is associated with a functional interface. In other instances, when the switch device 200 receives a signal from the optical switch device indicating the SF condition of the desired link does not exist, the routing protocol management module 255 can stop sending PCF-RF signals to the optical switch device. The routing protocol management module 255 can also send control signals to the optical switch device representing instructions to re-direct subsequent data streams back to the primary link from the back-up link (i.e., the link is effectively re-activated).

The routing protocol management module 255 can execute additional control plane functions such as, for example, sending IP configuration information to the different peripheral processing devices that join the different VLANs managed by the switch device 200, defining different RE logical interfaces 239a and/or 239b on the RE interface 238 and associating the different VLANs to the different RE logical interfaces 239a and/or 239b, periodically or semi-periodically monitoring the bandwidth usage of the different VLANs managed by the switch device 200, and/or the like.

In some instances, when an SD condition is detected in a link (e.g., associated with a 40 Gbps or a 100 Gbps interface) from the set of links by the optical switch device, the switch device 200 can receive a message including data units with the BIP-8 error check from the optical switch device (the BIP-8 error check is included in each of the PCS lanes of the message). Based on the information contained within the BIP-8 error check, the link status degradation level can be calculated by the PFE microkernel 224 and/or the PFE processing module 227 between a range of 0-100%, where a 0% degradation level indicates no signal degradation associated with the desired link, and a pre-determined degradation level (e.g., 100% or less than 100%) that indicates signal failure (SF condition) of the desired link (i.e., the link is effectively de-activated). A degradation level between 0% and the pre-determined level indicative of SF condition indicates an SD condition associated with a link. When an SD condition associated with a link is detected, the PFE microkernel 224 can send a signal to the RE kernel 234 via the PFE interface 228 that includes information on the signal degradation level of the desired link. The RE kernel 234 can check the identifiers of the VLANs associated with each of the RE logical interfaces 239a and 239b that have been defined on the RE interface 238. If the degraded link is found to be associated with one or multiple VLANs associated with RE logical interface 239a and/or 239b, a notification signal is sent by the RE kernel 234 to the routing protocol management module 255 and all the peripheral processing devices associated with the particular VLAN or set of VLANs. The notification signal can include, for example, a type-length-value (TLV) element that can include the link status degradation level in terms of percentage value that can range between 0%-100%.

In such instances, upon reception of the notification signal, the routing protocol management module 255 can generate and send to, for example, the optical switch device a first set of control signals that can represent corrective measures (as discussed above) to improve the signal quality in the desired link. Such control signals can be sent from the switch device 200 using, for example, the intermediate system to intermediate system (IS-IS) routing protocol. Additionally, the routing protocol management module 255 can also generate a second set of control signals that adjust the parameters of the set of VLANs affected by the degraded link. The routing protocol management module 255 can send the second set of control signals to the different upstream routers or other network nodes linking with the affected VLANs (e.g., via the IS-IS routing protocol) such that those routers and/or network nodes can steer transmission data stream away from the degraded link.

Figure 3:
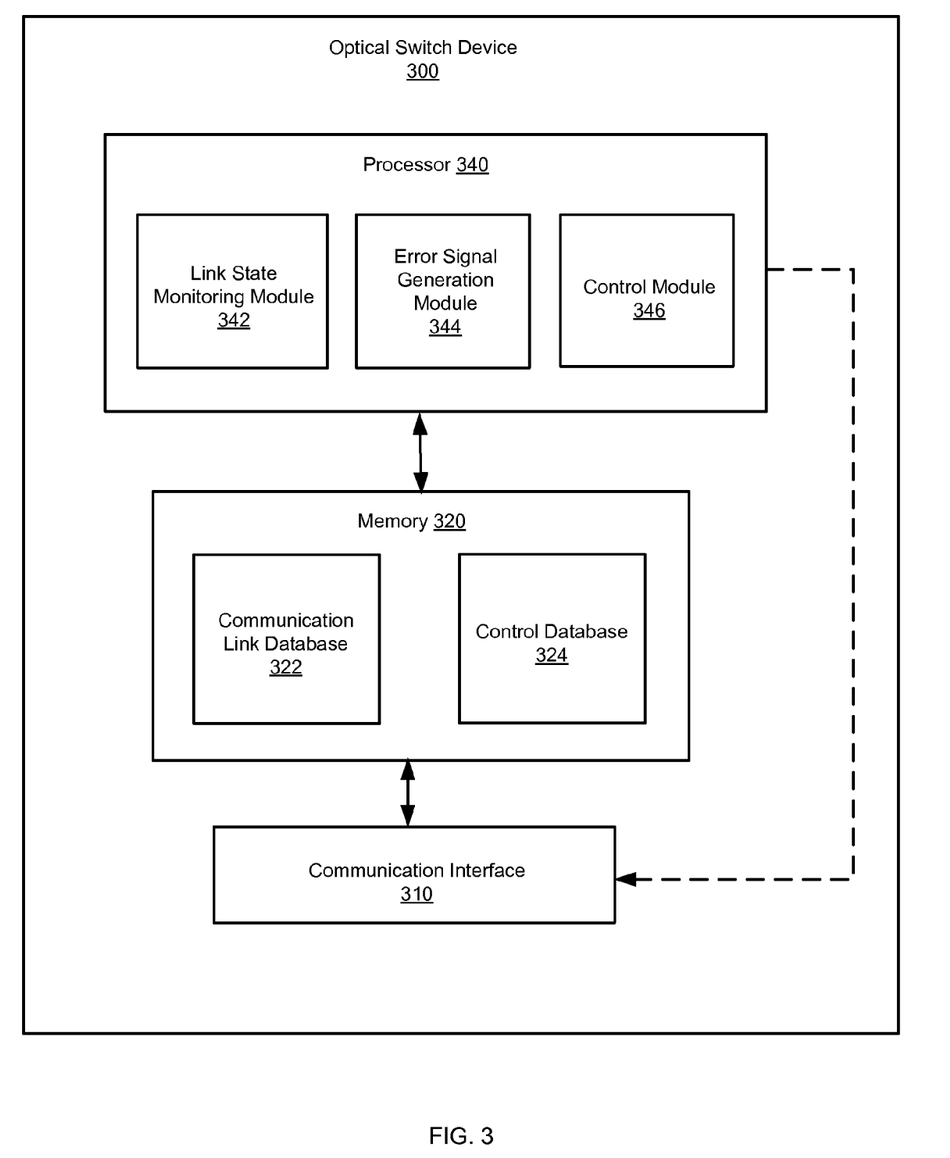
FIG. 3 is a system block diagram of an optical switch device, according to an embodiment.

FIG. 3 is a system block diagram of an optical switch device, according to an embodiment. Similar to optical switch device 130 and switch device 140 in the routing system 100 shown in FIG. 1, optical switch device 300 can be any device (e.g., a routing device, a switching device, etc.) that includes one or multiple 40 Gbps and/or a 100 Gbps optical and/or electrical interface(s) and can operatively couple the switch devices (e.g., switch device 110 and/or 120 in FIG. 1) to a network via a set of (optical) communication links. Typically, the optical switch device 300 can function as intermediate access switch and/or an intermediate router for transmitting and/or receiving high-speed data units between peripheral processing devices that are coupled to different switch devices. As shown in FIG. 3, the optical switch device 300 includes a communication interface 310, a memory 320 and a processor 340. Each component of optical switch device 200 can be operatively coupled to the other component of the optical switch device 300 as shown in FIG. 3. Furthermore, the operations of the communication interface 310 (e.g., transmit/receive data units and/or control units) as well as manipulations on memory 320, can be controlled by the processor 340.

The communication interface 310 can include multiple electrical and optical ports for implementing a wired connection (or communication link) between the optical switch device 300 and different switch devices (e.g., switch devices 110 and 120 in FIG. 1) and/or different network nodes (or devices) in the network (e.g., network 150 in FIG. 1). The wired connection can be, for example, twisted-pair electrical signaling via electrical cables, fiber-optic signaling via fiber-optic cables, and/or the like. As such, optical switch device 300 can receive data units and control units and/or transmit data units and control units through the communications interface 310 that is operably coupled to the communications interface of a switch device when optical switch device 300 is communicating with the switch device. Additionally, optical switch device 300 can receive data units and control units and/or transmit data units and control units through the communications interface 310 that is operable coupled to the communications interface of a network node (or device) when optical switch device 300 is communicating with the network node. Furthermore, in some instances, optical switch device 300 can implement a first wired connection (e.g., twisted-pair electrical signaling) with a first device (e.g., a switch device) that is operatively coupled to the optical switch device 300, and a second wired connection (e.g., such as fiber-optic signaling) with a second device (e.g., a network node) that is operatively coupled to the optical switch device 300.

The memory 320 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 320 can store instructions to cause the processor 340 to execute modules, processes and/or functions associated with optical switch device 300 and/or the routing system (e.g., routing system 100 in FIG. 1). The memory 320 includes a communication link database 322 and a control database 324. The communication link database 322 can store information associated with the different links from the set of links such as, for example, the bandwidth available for each link, the bit rates associated with data units transmitted in each link, the current signal degradation (SD) level associated with each link, past SD levels associated with a link (the past SD levels can stored for pre-determined period of time), the current status of a link (i.e., if the link is active or has been de-activated due to an SF condition), the threshold values associated with determining an SD or SF condition in a link, the IP and/or MAC address of the interfaces of the primary link and the backup link associated with a particular data stream, and/or the like.

The control database 324 can store the different routing protocol daemons (RPDs), routing protocol information, switching protocol information and/or other applications running on the optical switch device 300. The control database 324 can also store the instructions and the parameters of the different corrective methods (sent from the switch device) to mitigate an SD condition and/or an SF condition associated with a link from the set of links.

The processor 340 can be a general purpose processor, a field programmable gate array (FPGA), an application specific integrated circuit (ASIC), a digital signal processor (DSP), and/or so forth located on the motherboard of the optical switch device 300. The processor 340 can run and/or execute applications and/or other modules, processes and/or functions associated with the optical switch device 300 and/or the routing system (e.g., routing system 100 in FIG. 1). The processor 340 can include a link state monitoring module 342, an error signal generation module 344 and a control module 346.

The link state monitoring module 342, the error signal generation module 344 and the control module 346 can each be a hardware module or a software module stored in the memory 320 and/or executed in the processor 340. The link state monitoring module 342 can monitor the bit rate of the data units transmitted in each link and can compute the pre-FEC error rates associated a link from the set of links. The link state monitoring module 342 can compare the pre-FEC error rates of a link with the first threshold value and/or the second threshold value and/or the third threshold value (sent from a switch device) stored in the communication link database 322 to determine an SD condition or an SF condition associated with a link from the set of links. In some instances, when an SD condition is detected with a link, the error signal generation module 344 can generate a message (or a signal) that can include an error notification (e.g., include the BIP-8 error check in the data units in each PCS lane of the message transmitted in the desired link) and send the message to a switch device. In such instances, the control module 346 can access instructions stored in the control database 324 (that are received from a switch device) and can implement the different corrective methods to improve the signal quality in the desired link. In other instances, when no SD condition is detected with any link from the set of links, no error signals are generated from the error signal generation module 344.

In some other instances, when an SF condition is detected with a link, the error signal generation module 344 can generate and send a PCS-LF signal to an optical switch that is downstream from the optical switch device 300 (i.e., towards the destination device end for the data stream and not on the source device end). In such instances, the control module 346 can implement methods to de-active (i.e., bring down) the desired link (based on the PCS-RF signals sent from a switch device) and re-direct the data traffic or data stream to a backup link from the set of links. In yet other instances, when no SF condition is detected with any link from the set of links, no error signals are generated from the error signal generation module 344. In such instances, the control module 346 can implement methods to direct the data traffic or data stream back to the primary link from the backup link.

Figure 4:
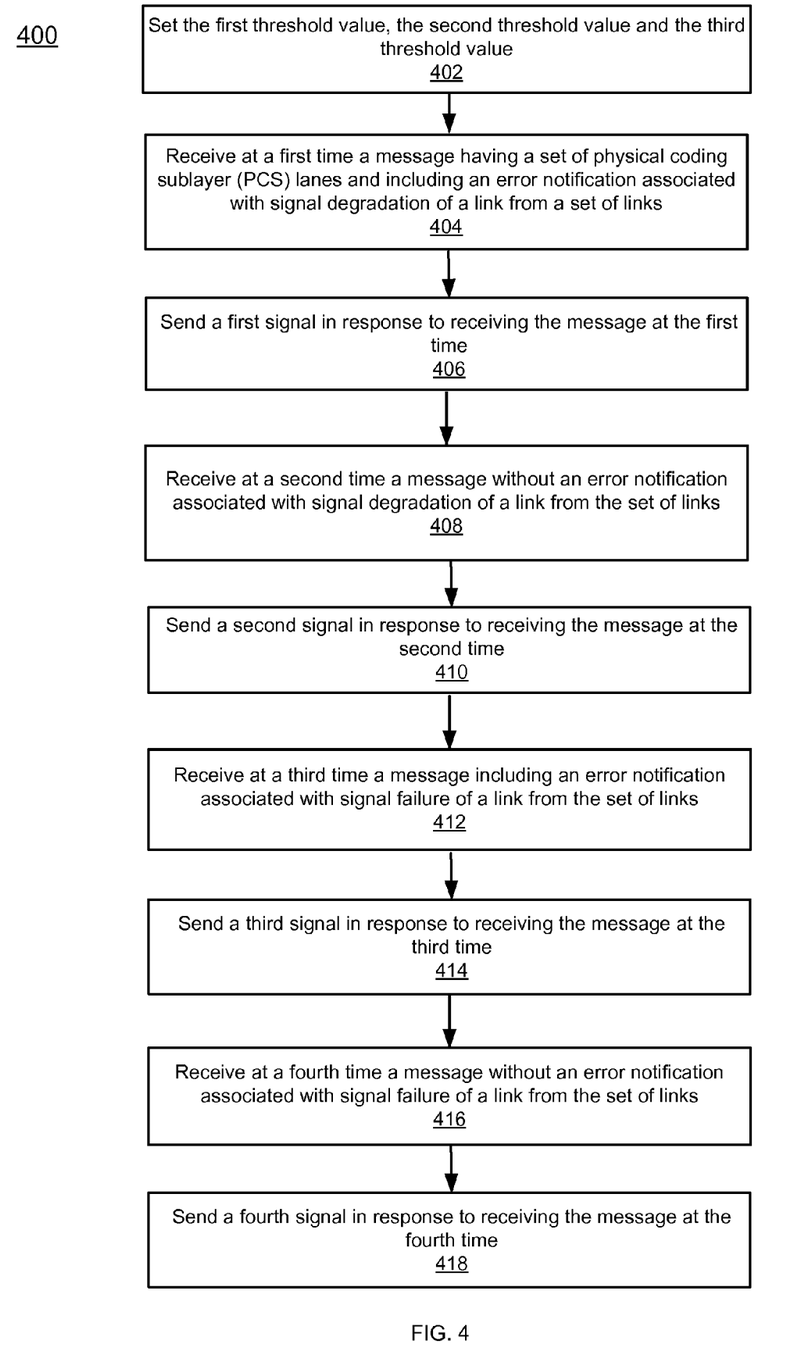
FIG. 4 is a flow chart illustrating a method for a switch device to detect an error associated with a link from a set of links and to implement corrective methods, according to an embodiment.

FIG. 4 is a flow chart illustrating a method for a switch device to detect an error associated with a link from a set of links and to implement corrective methods, according to an embodiment. The method 400 includes setting the first threshold value, the second threshold value and the third threshold value at, for example, a switch device, at 402. As described above, a switch device can be any device that includes one (or a set of) 40 Gbit and/or a 100 Gbit interface(s) and can operatively couple peripheral processing devices (e.g., compute nodes, service nodes, routers, and storage nodes, servers, storage devices, gateways, workstations, etc.) to a network. As described above, an indication of signal degradation (SD) of a link from the set of links can occur if the pre-FEC error rate associated with the link exceeds the first threshold value. An indication of no signal degradation of a link from the set of links can occur if the pre-FEC error rate associated with the link is lower than the second threshold value, where the second threshold value is smaller than the first threshold value. Additionally, the indication of signal failure (SF) of a link from the set of links can occur if the pre-FEC error rate associated with the link exceeds the third threshold value, where the third threshold value is greater than the first threshold value and the second threshold value. The first threshold value, the second threshold value and the third threshold value can be set by, for example, a network administrator or another user of a switch device and can be sent as a control signal from a switch device to, for example, an optical switch device.

At 404, a message (or signal) can be received at a first time having a set of physical coding sublayer (PCS) lanes and including an error notification associated with signal degradation of a link from a set of links. The message can be sent by, for example, an optical switch device and received by, for example, a switch device. As described above, an optical switch device can be any device (e.g., a routing device, a switching device, etc.) that includes one or multiple 40 Gbps and/or a 100 Gbps optical and/or electrical interface(s) and can operatively couple a switch device to a network via a set of (optical) communication links. As described above, each communication link (or link) from the set of communication links is associated with a separate 40 Gbps or 100 Gbps interface. Hence, an optical switch device can function as intermediate access switch and/or router for transmitting and/or receiving high-speed data units between peripheral processing devices that are coupled to different switch devices. As described above, the message can include an error notification within a first subset of PCS lanes from the set of PCS lanes (and not within a second subset of PCS lanes from the set of PCS lanes mutually exclusive from the first subset of PCS lanes). For example, the first subset of PCS lanes can be the odd PCS lanes from the set of PCS lanes and the second subset of PCS lanes can be the even PCS lanes from the set of PCS lanes.

At 406, a first signal is sent in response to receiving the message at the first time. The first signal can be sent by, for example, the switch device and the first signal can be received by, for example, the optical switch device. As described above, the first signal can be a control signal that can represent instructions for the optical switch device to implement corrective methods to improve the signal quality in the desired link such as, for example, signal amplification, noise cancellation via time-averaging the signal, filtration of out-of-band noise, and/or the like. Additionally, the first signal can also include instructions for the optical switch device to keep the desired link active (i.e., continue transmitting data units).

At 408, a message (or signal) can be received at a second time that does not include an error notification associated with signal degradation of a link from the set of links. The message received at the second time can also include a set of physical coding sublayer (PCS) lanes. The message can be received at the second time by, for example, a switch device and can be can be sent by, for example, an optical switch device. An absence of an error notification in the message received at the second time can indicate the lack of an SD or an SF condition associated with any link from the set of links.

At 410, a second signal is sent in response to receiving the message at the second time. Similar of the instance of the first signal, the second signal can be sent by, for example, the switch device and the second signal can be received by, for example, the optical switch device. Because the message received at the second time did not include an error notification, the second signal sent from the switch device will not include control signals that represent corrective methods. The second signal can, however, include instructions for the optical switch device to keep the desired link active (i.e., continue transmitting data units).

At 412, a message (or signal) can be received at a third time that includes an error notification associated with a signal failure of a link from the set of links. The message received at the third time can have a set of physical coding sublayer (PCS) lanes and can be sent by, for example, an optical switch device and received by, for example, a switch device. As described above, the error notification included in the message received at the third time can be within a first subset of PCS lanes from the set of PCS lanes (e.g., the odd PCS lanes from the set of PCS lanes, the even PCS lanes from the set of PCS lanes, and/or the like) (and not within a second subset of PCS lanes from the set of PCS lanes mutually exclusive from the first subset of PCS lanes).

At 414, a third signal is sent in response to receiving the message at the third time. The third signal can be sent by, for example, the switch device and the third signal can be received by, for example, the optical switch device. As described above, the third signal can be a control signal that can include, for example, PCS Remote Fault (RF) messages, instructions for the optical switch device to stop transmitting data units through the failed link, instructions for the optical switch device to re-direct subsequent transmitted data (including all the PCS lanes) from the failed link to a back-up link from the set of links that is associated with a functional interface, and/or the like.

At 416, a message (or signal) can be received at a fourth time that does not include an error notification associated with a signal failure of a link from the set of links. The message received at the fourth time can also include a set of physical coding sublayer (PCS) lanes. The message can be received at the fourth time by, for example, a switch device and can be sent by, for example, an optical switch device. In some instances, an absence of an error notification in the message received at the fourth time can indicate the lack of an SD or an SF condition associated with any link from the set of links. In other instances, an absence of an error notification in the message received at the fourth time can indicate mitigation of a previous SF condition associated with a link from the set of links.

At 418, a fourth signal is sent in response to receiving the message at the fourth time. Similar of the instance of the second signal, the fourth signal can be sent by, for example, the switch device and the fourth signal can be received by, for example, the optical switch device. Since the message received at the fourth time does not include any error notification, in some instances, the fourth signal sent from the switch device will not include control signals representing corrective or remedial methods. In other instances, an absence of an error notification in the message received at the fourth time can indicate mitigation of a previously existing SF condition associated with a link from the set of links. In such instances, the switch device can send a signal to the optical switch device that can represent instructions to re-direct subsequent transmitted data streams back to the (newly re-activated) primary link from the back-up link.

Note that the detection of signal degradation (or lack of signal degradation) in a link from the set of links and the corrective methods implemented to mitigate the signal degradation condition as shown in steps 404-410, and the detection of signal failure (or lack of signal failure) in a link from the set of links and the corrective methods implemented to mitigate the signal failure condition as shown in steps 412-418, can occur in any order. Said in another way, in some instances, steps 412-418 can occur after steps 404-410 (as shown in FIG. 4), and in other instances, steps 412-418 can occur before steps 404-410 (not shown in FIG. 4).

Figure 5:
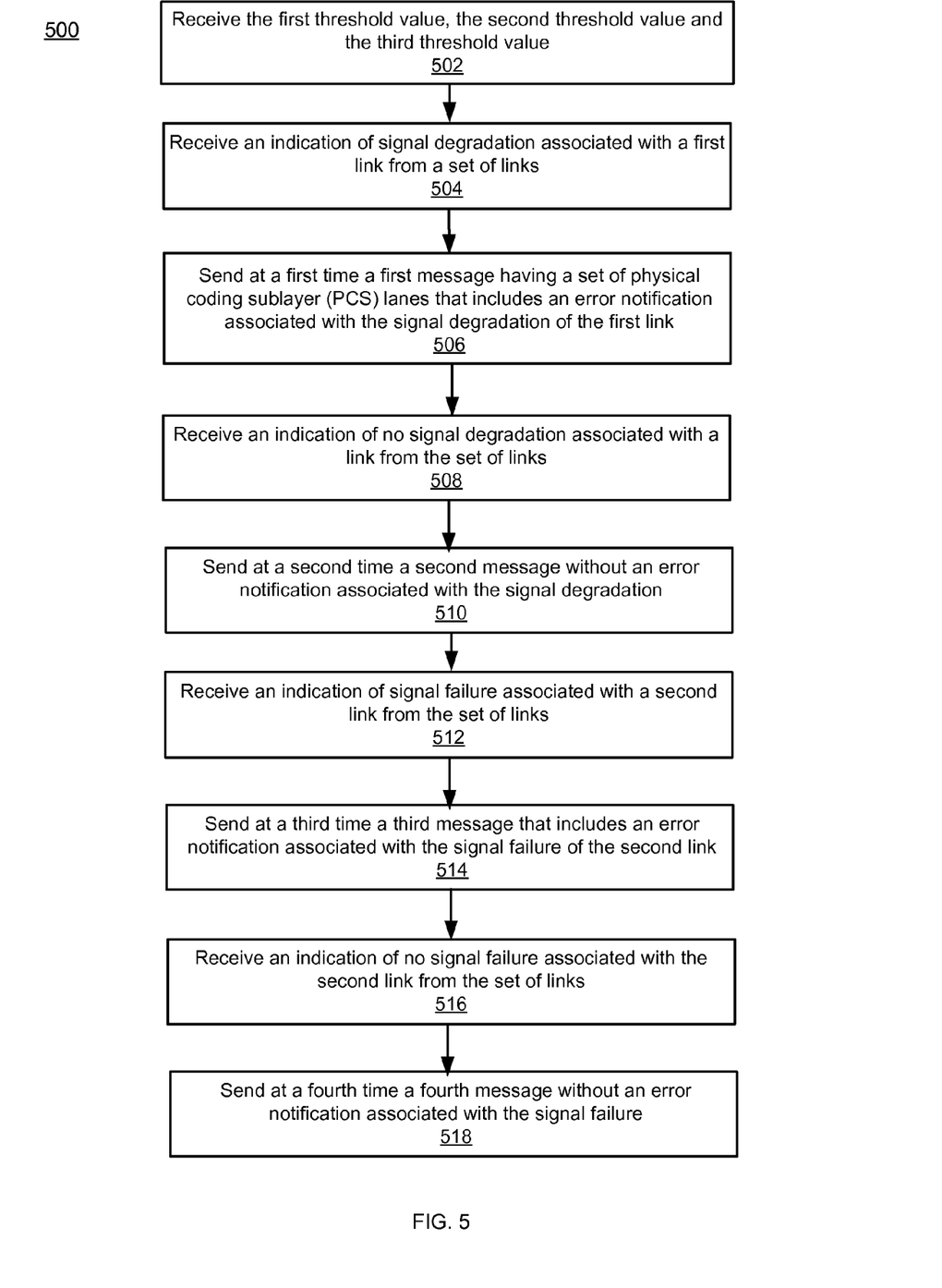
FIG. 5 is a flow chart illustrating a method for an optical switch device to detect an error associated with a link from a set of links, according to an embodiment.

FIG. 5 is a flow chart illustrating a method for an optical switch device to detect an error associated with a link from a set of links, according to an embodiment. The method 500 includes receiving the first threshold value, the second threshold value and the third threshold value at, for example, an optical switch device, at 502. As described above, an optical switch device can be any device (e.g., a routing device, a switching device, etc.) that includes, for example, one or multiple 40 Gbps and/or a 100 Gbps optical and/or electrical interface(s) and can operatively couple switch devices to a network via a set of (optical) communication links. The first threshold value, the second threshold value and the third threshold value are similar to that described above. Hence, the third threshold value is greater than the first threshold value and the second threshold value, and the first threshold value is greater than the second threshold value.

At 504, an indication of signal degradation associated with a first link from the set of links can be received at, for example, the optical switch device. As described above, an indication of signal degradation (SD) of the first link from the set of links can occur if the pre-FEC error rate associated with the first link exceeds the first threshold value. As described above, the link state monitoring module (e.g., link state monitoring module 342 in FIG. 3) of the optical communication device can compare the pre-FEC error rates of the first link with the first threshold value and/or the second threshold value and/or the third threshold value (sent from a switch device) stored in the communication link database 322 to determine the SD condition associated with the (desired) first link from the set of links.

At 506, a first message is sent at a first time having a set of physical coding sublayer (PCS) lanes that includes an error notification associated with signal degradation of the (desired) first link from the set of links. As described above, the first message can be sent by, for example, the optical switch device and can be received by, for example, a switch device. As described above, the optical switch device can swap the BIP-3 and BIP-7 bytes of the PCS lane alignment markers with the BIP-8 error check in each PCS lane of the first message and send the data units with the (BIP-8) error check to, for example, a switch device. As described above, the BIP-8 error check can indicate the status of the payload in a data unit (i.e., a message). The BIP-8 error check can be calculated over all bits of an alignment marker of a desired PCS lane and inserted into the BIP-3 and BIP-7 byte location of the alignment marker in the desired PCS lane. BIP-8 error checks can be set such that the overall data stream in a desired PCS lane has either even or odd parity.

At 508, an indication of no signal degradation associated with a link from the set of links can be received at, for example, the optical switch device. As described above, such an indication can indicate a lack of an SD or an SF condition associated with any link from the set of links. At 510, a second message is sent by, for example, the optical switch device at a second time that has a set of physical coding sublayer (PCS) lanes and does not include an error notification associated with signal degradation of a link from the set of links.

At 512, an indication of signal failure associated with a second link from the set of links can be received at, for example, the optical switch device. As described above, an indication of signal failure (SF) of the second link from the set of links can occur if the pre-FEC error rate associated with the second link exceeds the third threshold value. As described above the link state monitoring module (e.g., link state monitoring module 342 in FIG. 3) of the optical communication device can compare the pre-FEC error rates of the second link with the third threshold value stored in the communication link database 322 to determine the SF condition associated with the (desired) second link from the set of links.

At 514, a third message is sent by, for example, the optical switch device at a third time that has a set of physical coding sublayer (PCS) lanes and that includes an error notification associated with signal failure of the second link from the set of links. The third message sent at the third time can be received by, for example, a switch device. As described above, the third message can include a PCS Local Fault (LF) signal that is sent to, for example, an optical switch that is downstream from the optical switch device (i.e., towards the destination device end for the data stream and not on the source device end).

At 516, an indication of no signal failure associated with a link from the set of links can be received at, for example, the optical switch device. As described above, such an indication can indicate a lack of an SF condition associated with any link from the set of links. At 518, a fourth message is sent by, for example, the optical switch device at a fourth time that has a set of physical coding sublayer (PCS) lanes and that does not include an error notification associated with signal failure of any link from the set of links.

Note that the detection of signal degradation (or lack of signal degradation) in a link from the set of links as shown in steps 504-510 and the detection of signal failure (or lack of signal failure) in a link from the set of links as shown in steps 512-518 can occur in any order. Said in another way, in some instances, steps 512-518 can occur after steps 504-510 (as shown in FIG. 5), and in other instances, steps 512-518 can occur before steps 504-510 (not shown in FIG. 5).

The methods and apparatus shown in FIGS. 1-5 have the advantage of proactively monitoring the degradation level of a communication link associated with an interface of an optical switch device before signal failure occur on a link. This can provide a high degree of protection (from link failure) of a routing path and can significantly reduce redundant path switch-overs that often consume significant amounts of computational resources and time. Such methods can also provide CLI configuration support to a switch device at the physical RE interface level (e.g., Ethernet port) and/or the logical RE interface level (e.g., Ethernet VLAN). This can offer added flexibility in configuring the switch devices and configuring routing paths in different kinds of networks. The methods and apparatus shown in FIGS. 1-5 are generic in nature and can be implemented with any interface type and port speeds. Although the methods and apparatus shown in FIG. 1-5 have been discussed with respect to implementation on an operating software with the IS-IS routing protocol, such methods do not have exclusivity to any specific routing protocol, and thus can work with different kinds of routing protocols. Additionally, not all the features of the methods and apparatus shown and discussed in FIGS. 1-5 have the same priority or severity levels. Hence some features (e.g., an SF condition associated with a communication link) can have higher priority levels associated with them when compared to other features (e.g., an SD condition associated with a communication link). The severity or priority levels associated with different features are flexible and can user configurable.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
  a switch device configured to be operatively coupled to a network having a plurality of links, the switch device configured to receive, from an optical switch device at a first time, a message having a plurality of physical coding sublayer (PCS) lanes, the message including an error notification within a first subset of PCS lanes from the plurality of PCS lanes and not within a second subset of PCS lanes from the plurality of PCS lanes mutually exclusive from the first subset of PCS lanes, the error notification in response to signal degradation of a link from the plurality of links, the switch device configured to send a first signal in response to receiving the message at the first time, the switch device configured to receive at a second time a message without the error notification, the switch device configured to send a second signal in response to receiving the message at the second time.

2. The apparatus of claim 1, wherein:
the first subset of PCS lanes are odd PCS lanes from the plurality of PCS lanes, the second subset of PCS lanes are even PCS lanes from the plurality of PCS lanes.

3. The apparatus of claim 1, wherein:
the link is a first link from the plurality of links,
the switch device is configured to receive at a third time a message having an error notification associated with signal failure of a second link from the plurality of links, the switch device configured to send a third signal in response to receiving the message at the third time,
the switch device is configured to receive at a fourth time a message without the error notification associated with signal failure, the switch device configured to send a fourth signal in response to receiving the message at the fourth time.

4. The apparatus of claim 1, wherein:
the switch device is configured to calculate a link status degradation level associated with the link from the plurality of links based on the error notification.

5. An apparatus, comprising:
a switch device configured to be operatively coupled to a network having a plurality of links, the switch device configured to receive at a first time a message having a plurality of physical coding sublayer (PCS) lanes, the message including an error notification within a first subset of PCS lanes from the plurality of PCS lanes and not within a second subset of PCS lanes from the plurality of PCS lanes mutually exclusive from the first subset of PCS lanes, the error notification being associated with signal degradation of a link from the plurality of links, the switch device configured to send a first signal in response to receiving the message at the first time,
the switch device configured to receive at a second time a message without the error notification, the switch device configured to send a second signal in response to receiving the message at the second time,
the message including the error notification associated with signal degradation is associated with a first threshold, the message without the error notification is associated with a second threshold lower than the first threshold.

6. The apparatus of claim 1, wherein:
the message including the error notification associated with signal degradation is received in response to a pre-forward-error-correction (FEC) error rate associated with the link exceeding a first threshold, the message without the error notification is received in response to a pre-FEC error rate associated with the link being below a second threshold lower than the first threshold.

7. The apparatus of claim 1, wherein:
the switch device is configured to be operatively coupled to the optical switch device that is operatively coupled to the plurality of links, the switch device is configured to receive the message at the second time from the optical switch device, the switch device is configured to send the first signal and the second signal to the optical switch device.

8. The apparatus of claim 1, wherein:
the link is a first link from the plurality of links,
the switch device is configured to receive at a third time a message having an error notification associated with signal failure, the switch device configured to send a third signal in response to receiving the message at the third time,
the message including the error notification associated with signal degradation is received in response to a pre-forward-error-correction (FEC) error rate associated with the link exceeding a first threshold, the message without the error notification is received in response to a pre-FEC error rate associated with the link being below a second threshold lower than the first threshold, the message including the error notification associated with signal failure is in response to a pre-FEC error rate associated with the link being above a third threshold higher than the first threshold.

9. An apparatus, comprising:
an optical switch device configured to be operatively coupled to a switch device and a network having a plurality of links, the optical switch device configured to receive an indication of signal degradation associated with a link from the plurality of links, the optical switch device configured to send at a first time a message having a plurality of physical coding sublayer (PCS) lanes in response to the indication of signal degradation, the message including an error notification within a first subset of PCS lanes from the plurality of PCS lanes and not within a second subset of PCS lanes from the plurality of PCS lanes mutually exclusive from the first subset of PCS lanes, the error notification being associated with the signal degradation,
the optical switch device configured to receive an indication of no signal degradation associated with the link, the optical switch device configured to send at a second time a message without the error notification in response to the indication of no signal degradation.

10. The apparatus of claim 9, wherein:
the first subset of PCS lanes are odd PCS lanes from the plurality of PCS lanes, the second subset of PCS lanes are even PCS lanes from the plurality of PCS lanes.

11. The apparatus of claim 9, wherein:
the link is a first link from the plurality of links,
the optical switch device is configured to receive an indication of signal failure of a second link from the plurality of links, the optical switch device configured to send at a third time a message with an error notification associated with signal failure of the second link in response to the indication of signal failure,
the optical switch device is configured to receive at a fourth time an indication of no signal failure of the second link, the optical switch device configured to send a message without an error notification associated with signal failure of the second link in response to the indication of no signal failure of the second link.

12. The apparatus of claim 9, wherein:
the indication of signal degradation is associated with a first threshold, the indication of no signal degradation is associated with a second threshold lower than the first threshold.

13. The apparatus of claim 9, wherein:
the message at the first time is sent in response to a pre-forward-error-correction (FEC) error rate associated with the link exceeding a first threshold, the message at the second time is sent in response to a pre-FEC error rate associated with the link being below a second threshold lower than the first threshold.

14. An apparatus, comprising: a switch device configured to be operatively coupled to a network having a plurality of links, the switch device configured to receive, from an optical switch device at a first time, a message having an error notification in response to signal degradation of a first link from the plurality of links, the switch device configured to send a first signal in response to receiving the message at the first time, the switch device configured to receive at a second time a message having an error notification in response to signal failure of a second link from the plurality of links, the switch device configured to send a second signal in response to receiving the message at the second time, and the message at the first time is a message having a plurality of physical coding sublayer (PCS) lanes, the error notification associated with signal degradation is within a first subset of PCS lanes from the plurality of PCS lanes and not within a second subset of PCS lanes from the plurality of PCS lanes mutually exclusive from the first subset of PCS lanes.

15. The apparatus of claim 14, wherein: the switch device configured to receive at a third time a message without the error notification associated with signal degradation, the switch device configured to send a third signal response to receiving the message at the third time.

16. The apparatus of claim 14, wherein: the first subset of PCS lanes are odd PCS lanes from the plurality of PCS lanes, the second subset of PCS lanes are even PCS lanes from the plurality of PCS lanes.

17. The apparatus of claim 14, wherein:
the switch device configured to receive at a third time a message without the error notification associated with signal degradation, the switch device configured to send a third signal response to receiving the message at the third time,
the message including the error notification associated with signal degradation is associated with a first threshold, the message without the error notification is associated with a second threshold lower than the first threshold.

18. The apparatus of claim 14, wherein:
the switch device configured to receive at a third time a message without the error notification associated with signal degradation, the switch device configured to send a third signal in response to receiving the message at the third time,
the message including the error notification associated with signal degradation is received in response to a pre-forward-error-correction (FEC) error rate associated with the link exceeding a first threshold, the message without the error notification is received in response to a pre-FEC error rate associated with the link being below a second threshold lower than the first threshold.

19. The apparatus of claim 14, wherein:
the switch device is configured to be operatively coupled to the optical switch device that is operatively coupled to the plurality of links, the switch device is configured to receive the message at the second time from the optical switch device, the switch device is configured to send the first signal and the second signal to the optical switch device.

20. The apparatus of claim 14, wherein:
the switch device is configured to receive at a third time a message without the error notification associated with signal degradation, the switch device configured to send a third signal in response to receiving the message at the third time,
the message including the error notification associated with signal degradation is received in response to a pre-forward-error-correction (FEC) error rate associated with the first link exceeding a first threshold, the message without the error notification associated with signal degradation is received in response to a pre-FEC error rate associated with the first link being below a second threshold lower than the first threshold, the message including the error notification associated with signal failure is received in response to a pre-FEC error rate associated with the second link being above a third threshold higher than the first threshold.

* * * * *